United States Patent
Ikeda

Patent Number: 6,040,858
Date of Patent: Mar. 21, 2000

[54] METHOD AND APPARATUS FOR EXPANDING THE DYNAMIC RANGE OF SENSED COLOR IMAGES

[75] Inventor: Eiichiro Ikeda, Tokyo, Japan

[73] Assignee: Canon Kabushiki Kaisha, Tokyo, Japan

[21] Appl. No.: 08/559,074

[22] Filed: Nov. 16, 1995

[30] Foreign Application Priority Data

Nov. 18, 1994 [JP] Japan ................. 6-285066
Nov. 18, 1994 [JP] Japan ................. 6-285067

[51] Int. Cl.$^7$ ............ H04N 5/52; H04N 5/335; H04N 9/64; H04N 9/68
[52] U.S. Cl. .......... 348/242; 348/256; 348/279; 348/645; 348/679
[58] Field of Search .................. 348/207, 222, 348/224, 225, 241, 242, 250, 255, 256, 266, 272, 273, 277, 279, 362, 645–648, 675, 679; H04N 5/335, 5/52, 9/64, 9/68

[56] References Cited

U.S. PATENT DOCUMENTS

| | | | |
|---|---|---|---|
| 4,189,751 | 2/1980 | Nagumo | 358/213 |
| 4,614,966 | 9/1986 | Yunoki et al. | 358/44 |
| 4,922,330 | 5/1990 | Saito et al. | 358/29 |
| 5,162,914 | 11/1992 | Takahashi et al. | 358/213.19 |
| 5,247,366 | 9/1993 | Ginosar et al. | 358/209 |
| 5,420,635 | 5/1995 | Konishi et al. | 348/362 |
| 5,619,280 | 4/1997 | Yamashita et al. | 348/645 |

FOREIGN PATENT DOCUMENTS

| | | | |
|---|---|---|---|
| 63-306778 | 12/1988 | Japan | H04N 5/235 |
| WO 91/12695 | 8/1991 | WIPO | H04N 9/68 |
| WO 94/18801 | 8/1994 | WIPO | H04N 9/07 |

*Primary Examiner*—Tuan Ho
*Assistant Examiner*—Ngoc-Yen Vu
*Attorney, Agent, or Firm*—Morgan & Finnegan LLP

[57] ABSTRACT

Disclosed is an image processing method of expanding the dynamic range by determining a saturated or noise region in an image signal and replacing the image signal with a proper image signal. A threshold value is set in units of colors on the basis of a standard image signal for each color, which is obtained upon sensing an image in a standard exposure, and a non-standard image signal for each color, which is obtained upon sensing the image in a non-standard exposure. A saturated or noise region is determined by applying the threshold value set in units of colors to the standard image signal. A region determined as a saturated or noise region is replaced with the non-standard image signal.

31 Claims, 10 Drawing Sheets

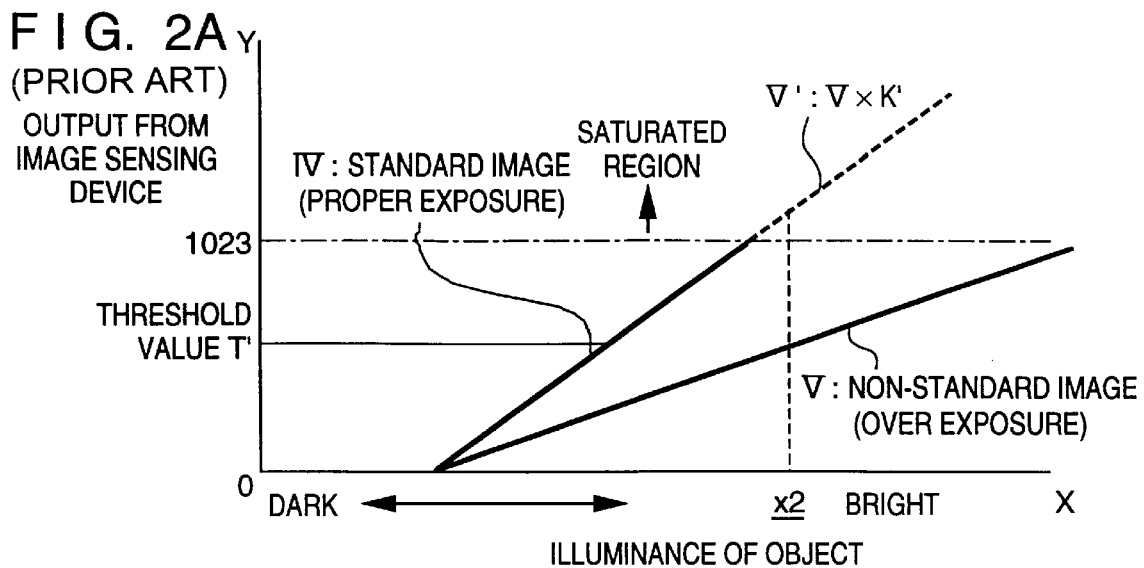
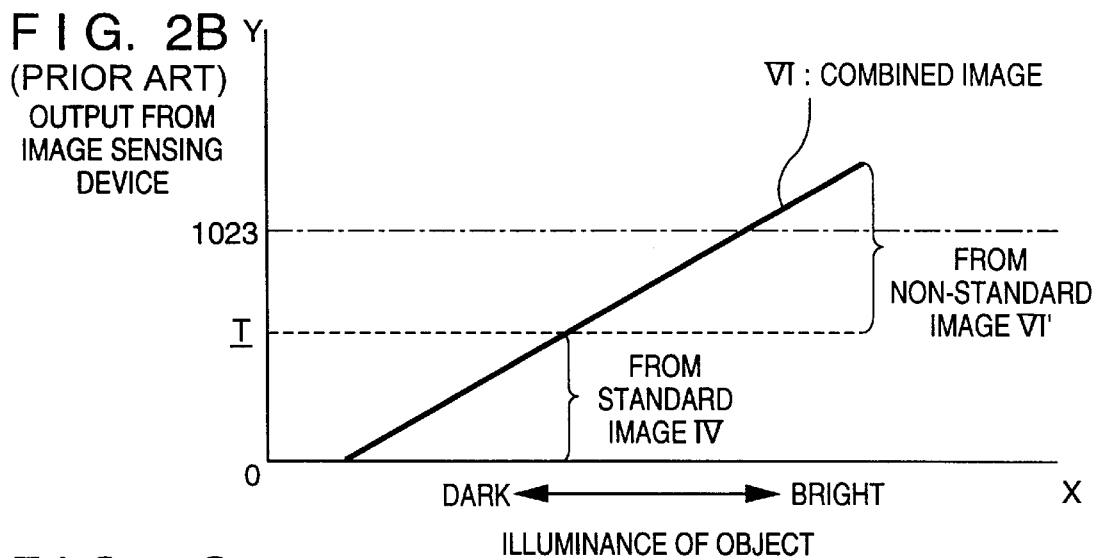
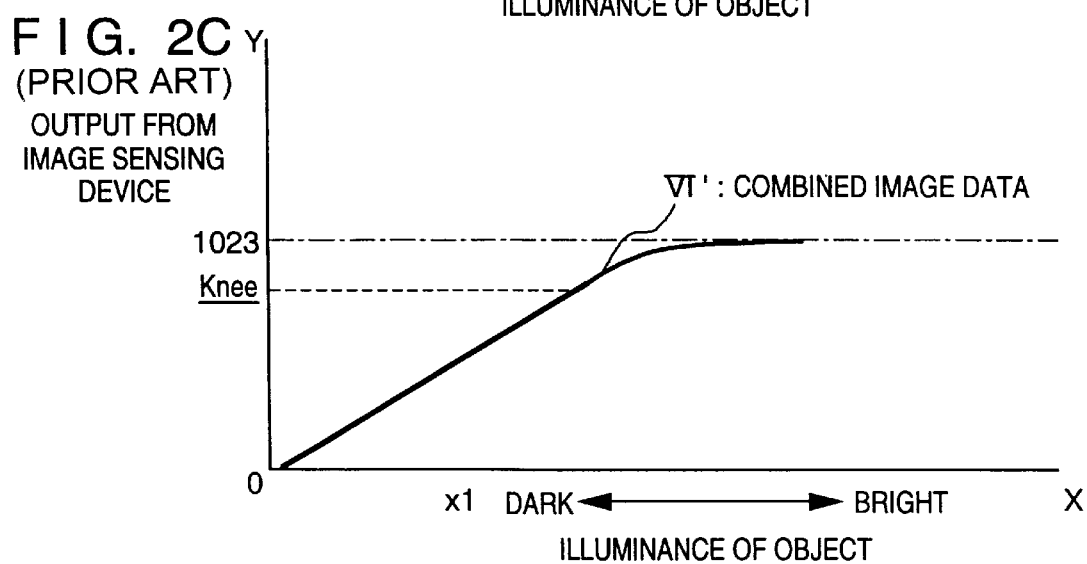

FIG. 8

STANDARD IMAGE (PROPER EXPOSURE)

| 30 | 40 | 580 | 700 | 820 | 820 |
|---|---|---|---|---|---|
| 30 | 30 | 600 | 600 | 810 | 800 |
| 30 | 40 | 600 | 600 | 800 | 820 |
| 30 | 50 | 500 | 500 | 1000 | 1000 |
| 500 | 500 | 500 | 500 | 1023 | 1023 |
| 500 | 500 | 500 | 500 | 1023 | 1023 |

FIG. 9

NON-STANDARD IMAGE (UNDER EXPOSURE)

| 0 | 0 | 580 | 700 | 900 | 900 |
|---|---|---|---|---|---|
| 0 | 0 | 600 | 600 | 820 | 810 |
| 5 | 10 | 600 | 600 | 820 | 850 |
| 5 | 50 | 500 | 515 | 1150 | 1150 |
| 500 | 500 | 500 | 510 | 1200 | 1200 |
| 500 | 500 | 500 | 515 | 1300 | 1300 |

FIG. 10

|NON-STANDARD IMAGE × K − STANDARD IMAGE|

| 30 | 40 | 0 | 0 | 80 | 80 |
|---|---|---|---|---|---|
| 30 | 30 | 0 | 0 | 10 | 10 |
| 25 | 30 | 0 | 0 | 20 | 30 |
| 25 | 40 | 0 | 0 | 150 | 150 |
| 0 | 500 | 0 | 0 | 177 | 177 |
| 0 | 0 | 0 | 0 | 277 | 277 |

METHOD AND APPARATUS FOR EXPANDING THE DYNAMIC RANGE OF SENSED COLOR IMAGES

BACKGROUND OF THE INVENTION

The present invention relates to an image processing method and apparatus for processing an image obtained using, e.g., an image sensing device, and an image sensing apparatus.

In recent years, image sensing devices such as CCD image sensing devices are popularly used as image reading elements for television cameras, video cameras, electronic cameras, and the like. However, the image sensing device is inferior to silver halide media in terms of the dynamic range, and an image obtained by an image sensing device has considerably low quality depending on the photographing conditions.

In order to expand the dynamic range of an image sensing device, a technique for sensing an image of an identical scene in different exposure amounts to obtain a plurality of image signals, and combining the plurality of image data by a predetermined calculation to obtain an image with an expanded dynamic range is proposed in, e.g., Japanese Patent Laid-Open No. 63-306778.

FIGS. 1A to 1C and FIGS. 2A to 2C are graphs showing typical conventional methods of expanding the dynamic range.

The graph in FIG. 1A shows the relationship between an illuminance (abscissa) and an output from the image sensing device (ordinate) obtained upon sensing a certain object. In FIG. 1A, a characteristic I represents the relationship between an illuminance and an output from the device for an image obtained upon sensing the object in a proper exposure (to be referred to as a "standard image" hereinafter). A characteristic II represents the relationship between an illuminance and an output from the device for an image obtained upon sensing the object in an over exposure (to be referred to as a "non-standard image" hereinafter). Referring to FIG. 1A, signals below an output level n are regarded as noise. A characteristic I' is obtained when an output value from the image sensing device (Y-axis) of the standard image I is multiplied by a luminance level adjustment value K.

A concept of image combining according to this method will be described. In FIG. 1A, at a position "$x_1$" on the axis representing the object illuminance, as for the image signal (image signal I) obtained in a proper exposure, the output from the image sensing device is at noise level. However, the image signal (image signal II) obtained in an over exposure has a proper value (exceeds the noise level n). That is, when an output value between level 0 and the noise level n is replaced with the output value of the non-standard image II, an image signal with an expanded dynamic range can be obtained. As shown in FIG. 1A, the gradient of the standard image I obtained in a proper exposure is different from that of the non-standard image obtained in an over exposure. Therefore, when the signal value I is only replaced with the signal value II, a discontinuous region is generated. For replacement, not the image signal I but an image signal I' is used.

In FIG. 1A, the image signal I' (to be also referred to as a standard image hereinafter) is obtained by multiplying the standard image I by the predetermined luminance level adjustment value K. The level adjustment value K is set such that the gradient of the standard image I' coincides with that of the non-standard image signal II. Processing of generating the standard image I' will be referred to as "luminance level adjustment" hereinafter. With this luminance level adjustment, a noise level n' of the standard image I' becomes n×K.

An appropriate threshold value T is set above the noise level n' (=n×K). As shown in FIG. 1B, data in a region below the threshold value T is replaced with the data of the non-standard image II. As for a region above the threshold value T, the data of the standard image I' is used without being processed. With this processing, noise in the section (n'−n) of the standard image I' is removed. The gradient of a combined image III (FIG. 1B) obtained in this manner corresponds to the gradient of the standard image I multiplied by K. Therefore, as shown in FIG. 1C, when the gradient of the combined image III is multiplied by 1/K to obtain the original gradient, the luminance level corresponding to the standard image I can be obtained. With the above processing, combined image data III' with an expanded dynamic range, i.e., at a low noise level can be obtained.

The conventional technique for expanding the dynamic range by decreasing noise regions has been described above. A technique for expanding the dynamic range by decreasing saturated regions will be described below with reference to FIGS. 2A to 2C.

FIGS. 2A to 2C are graphs for explaining a technique for combining an image sensed in a proper exposure (to be referred to as a standard image Iv hereinafter) with an image sensed in an under exposure (to be referred to as a standard image V hereinafter).

When image data is represented as 8-bit data, and the output level exceeds 1,023, the image data is saturated. Referring to FIG. 2A, at "x2" on the axis representing the object illuminance, the image data of the standard image IV is saturated while the image data of the standard image V has a proper value. Therefore, as shown in FIG. 2A, the gradient of a non-standard image V', which is obtained by multiplying the gradient of the standard image V by the luminance level adjustment value K', i.e., by multiplying the data of the standard image V by K', coincides with that of the standard image IV. As a result, the non-standard image V' obtains a luminance level corresponding to that of the standard image IV. As in noise removal (FIG. 1A), an appropriate threshold value T' is set. The image data of the standard image IV in a region above the threshold value T' is replaced with the non-standard image V'. As for a region below the threshold value T', the image data of the standard image IV is used without being processed. With this processing, the data of a combined image VI (FIG. 2B) has the same luminance level (gradient) as that of the standard image IV in FIG. 2A, though it has a 10-bit width. Hence, an appropriate knee point is set, as shown in FIG. 2C, and a bright region is compressed while maintaining the same gradient as that of the standard image IV.

With the above processing, image data VI' with an expanded dynamic range without saturation in a bright portion can be combined.

In the above conventional techniques, a dark noise region or a saturated region of a standard image is determined using a predetermined threshold value (T or T'). In the conventional techniques, when the image sensing device has a color filter, an output signal from the image sensing device is used without being processed to set a threshold value.

However, output values from image sensing devices vary in accordance with colors because of the spectral sensitivity, so the dark noise or saturated region cannot be completely determined. This problem will be described below referring to a case wherein a saturated region of a standard image sensed in a proper exposure is determined and replaced with a corresponding region of a non-standard region.

When the image sensing device has three color filters for R, G, and B, saturated regions in each of R, G, and B image data may not be determined and separated unless the characteristics of each color filter is taken into consideration. For this reason, saturated regions undesirably remain in combined image data. In addition, it becomes difficult to set a threshold value because of variations in each color image signal.

SUMMARY OF THE INVENTION

The present invention has been made to solve the above problem, and has as its object to provide an image processing method and apparatus, which can appropriately determine an improper image region such as a saturated region and a noise region, and an image sensing apparatus for outputting an image signal with the region corrected.

It is another object of the present invention to provide an image processing method and apparatus for appropriately determining a saturated region, and an image sensing apparatus for outputting an image signal with the region corrected.

It is still another object of the present invention to provide an image processing method and apparatus for appropriately determining a noise region, and an image sensing apparatus for outputting an image signal with the region corrected.

In order to achieve the above object, according to the present invention, there is provided a method of determining the a threshold value setting algorithm on the basis of an average value, and a method of determining the threshold value setting algorithm on the basis of the degree of change.

It is still another object of the present invention to provide an image processing method and apparatus, which can set a threshold value to accurately determine an improper region, and an image sensing apparatus for outputting an image signal with the region corrected.

In order to achieve the above object, according to the present invention, a threshold value is determined on the basis of a standard image signal obtained in a standard exposure and a non-standard image signal obtained in a non-standard exposure.

In order to achieve the above object, according to the present invention, a threshold value is applied to a standard image signal to determine whether the signal is an improper image signal.

It is still another object of the present invention to provide an image processing method and apparatus, which can replace an image signal of a region determined as an improper image signal with a proper image signal, and an image sensing apparatus for outputting an image signal with the region corrected.

It is still another object of the present invention to provide an image processing method and apparatus, which replace an image signal of a region of standard image determined as an improper image signal with a non-standard image signal obtained in a non-standard exposure to expand the dynamic range of the entire image signal, and an image sensing apparatus for outputting an image signal with the region corrected.

It is still, another object of the present invention to provide an image processing method and apparatus free from a hue offset, and an image sensing apparatus for outputting an image signal with the region corrected.

In order to achieve the above object, according to the present invention, there is provided an image processing method and apparatus, which determine a saturated region by using the minimum value of threshold values set in units of colors, and an image sensing apparatus for outputting an image signal with the region corrected.

In order to achieve the above object, according to the present invention, there is provided an image processing method and apparatus, which determine a noise region by using the maximum value of threshold values set in units of colors, and an image sensing apparatus for outputting an image signal with the region corrected.

It is still another object of the present invention to provide an image processing method and apparatus free from a pseudo contour even when the dynamic range is expanded, and an image sensing apparatus for outputting an image signal with the region corrected.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2A to 2C are graphs for explaining another conventional technique for expanding the dynamic range by correcting a saturated-region;

FIG. 8 is a view showing the standard image (proper exposure);

FIG. 9 is a view showing the non-standard image (under exposure);

FIG. 10 is a view showing a divided state of an image proper region and an improper region in the first embodiment;

DETAILED DESCRIPTION OF THE PREFERRED EMBODIMENTS

The present invention will be described below in detail with reference to embodiment to which the present invention is applied. In these embodiments, an image processing apparatus is applied to an image sensing apparatus.

<Arrangement of Apparatus>

Figure 1A:
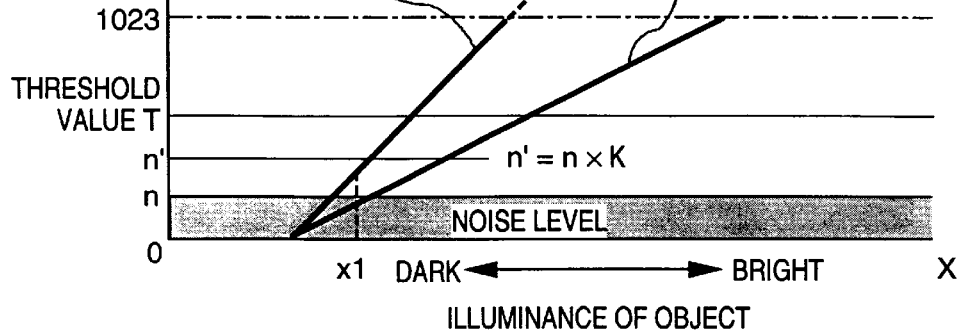
FIGS. 1A to 1C are graphs for explaining a conventional technique for expanding the dynamic range by correcting a noise region.
Figure 1B:
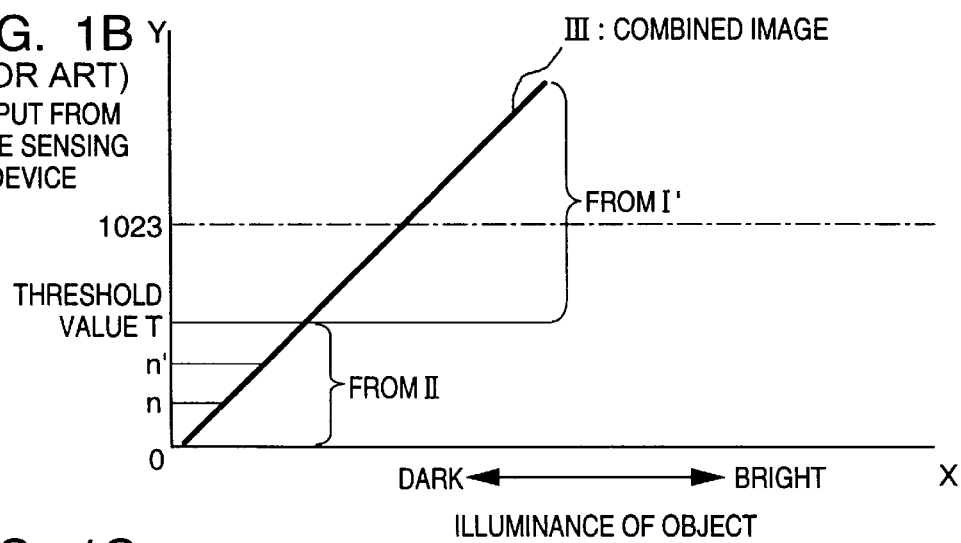
Figure 1C:
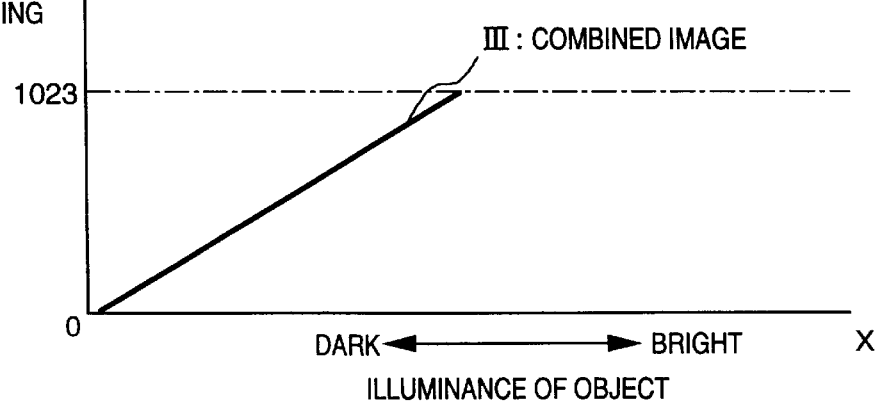
Figure 3:
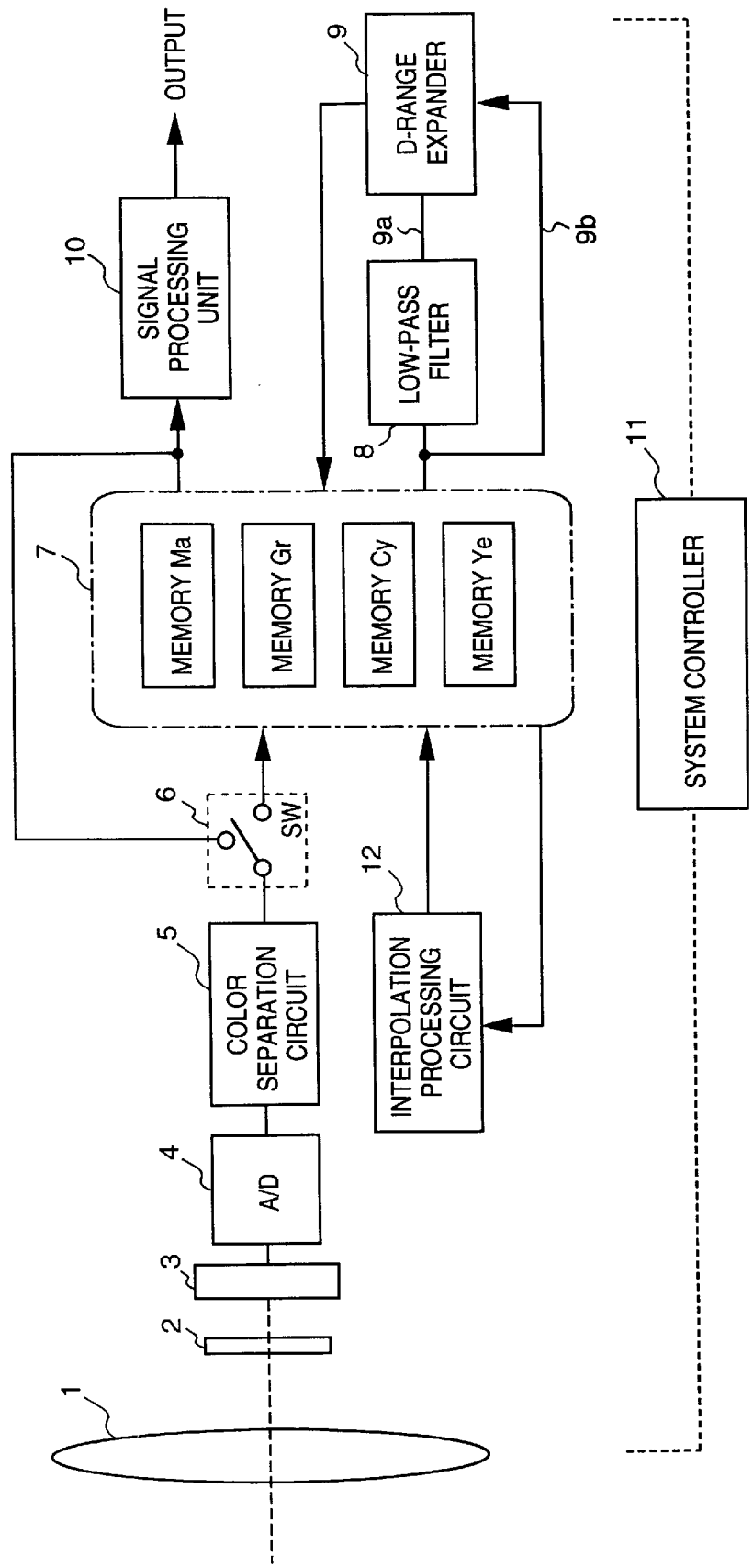
FIG. 3 is a block diagram schematically showing the arrangement of an image sensing apparatus according to the first and second embodiments of the present invention.

FIG. 3 is a block diagram of an image sensing apparatus according to an embodiment of the present invention.

Figure 4:
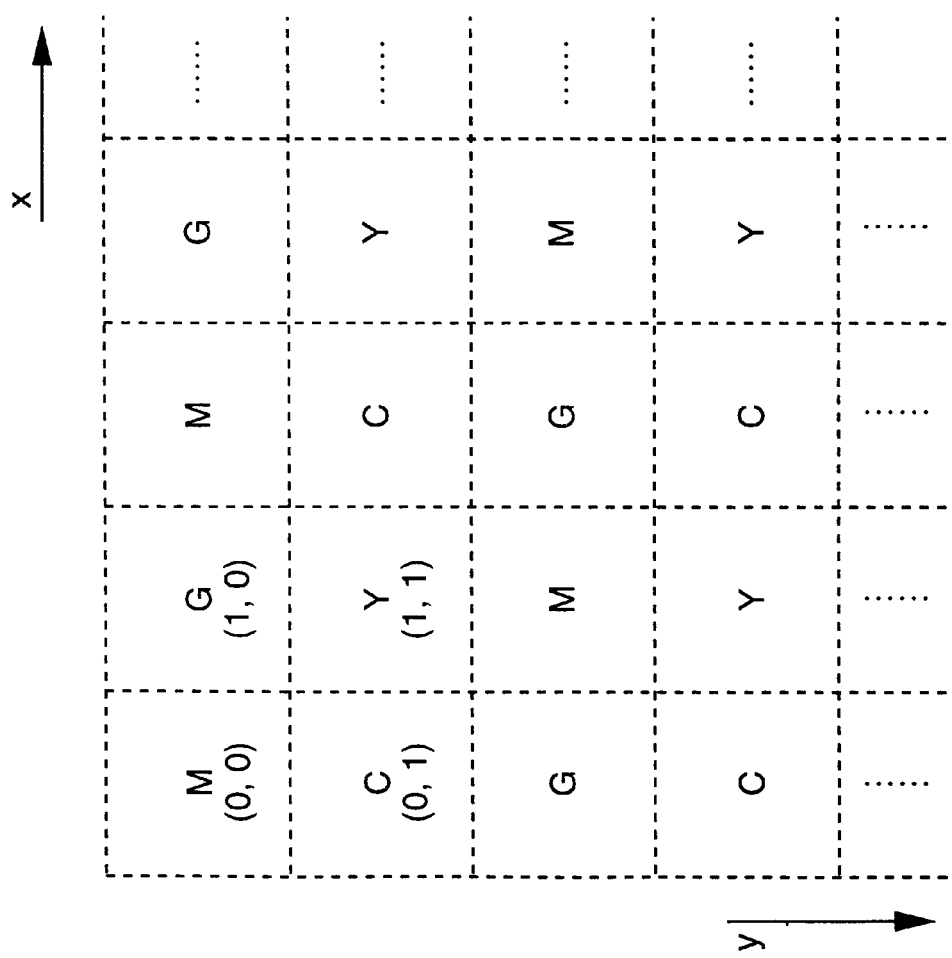
FIG. 4 is a view showing the arrangement of color filters of an image sensing device used in the image sensing apparatus in FIG. 3.

Referring to FIG. 3, reference numeral 1 denotes a lens on which image light from an object is incident; 2, an optical low-pass filter; and 3, an image sensing device such as a CCD. Complementary color filters of four colors arranged as shown in FIG. 4 are bonded to the light-receiving surface of the image sensing device 3.

Referring to FIG. 3, reference numeral 4 denotes an A/D converter for converting an image signal from the image sensing device 3 into a digital signal; 5, a color separation circuit for separating image data from the A/D converter 4 into four color image data (magenta Ma, yellow Ye, cyan Cy, and green Gr); 6, a switch; 7, a memory for storing four color image data; 8, a low-pass filter; 9, a dynamic range expander; 10, a signal processing unit; 11, a system controller; and 12, an interpolation processing circuit.

The operation of each circuit shown in FIG. 3 will be described below.

An object image (not shown) is projected onto the image sensing device 3 through the lens 1 and the optical low-pass filter 2. An image signal output from the image sensing device 3 is converted into a digital signal by the A/D converter 4 and separated into four chrominance signals of Ma (magenta), Gr (green), Cy (cyan) and Ye (yellow) by the color separation circuit 5. The system controller 11 controls the operations of all the circuits and processing units. In the image sensing apparatus of this embodiment, two modes, i.e., an "expanding mode" for expanding the dynamic range and a "normal model" for not expanding the dynamic range are set. The controller 11 determines on the basis of an output value from the image sensing device 3 or a request from the user whether the dynamic range need be expanded. In the "normal mode", the switch 6 is connected to the signal processing unit 10 side, and an output from the color separation circuit 5 is immediately sent to the signal processing unit 10. The signal processing unit 10 performs a known matrix calculation of the image data and outputs the image data as a luminance signal and a color difference signal.

A case wherein the "expanding mode" for expanding the dynamic range is set will be described below. We propose two techniques of dynamic range expanding processing in the expanding mode. In the first technique (first embodiment), an image region detected as a saturated region because of the narrow dynamic range of the image sensing device is replaced with data of an image obtained not to generate a saturated region. In the second technique (second embodiment), in addition to processing according to the first technique, a dark-noisy region is replaced with noise-free image data.

<First Embodiment>

In the expanding mode, the switch 6 is connected to the memory 7 side. An output from the color separation circuit 5 is guided to the memory 7 through the switch 6 and stored in the memory 7 in units of chrominance signals. The interpolation processing circuit 12 checks the chrominance signals stored in the memory 7, interpolates omitted pixels for each color, and stores the signals in the memory 7 again. High-frequency components are removed from the four chrominance signals after pixel interpolation processing, which are stored in the memory 7. Thereafter, the chrominance signals are sent to the dynamic range (to be referred to as a D-range hereinafter) expander 9.

There are two input paths from the memory 7 to the expander 9. A path 9a is an input path from the filter 8, as described above. A path 9b is a direct input path from the memory 7. More specifically, image data received by the D-range expander 9 through the path 9b is not processed through the low-pass filter. On the other hand, image data received by the D-range expander 9 through the path 9a is processed through the low-pass filter, as described above. When the D-range of an image is to be expanded by the D-range expander 9, a threshold value is determined on the basis of image data processed through the low-pass filter (i.e., image data accessed through the path 9a). Thereafter, this threshold value is used to perform D-range expanding processing of image data accessed through the path 9b. The reason why the threshold value is determined using the image data processed through the low-pass filter is that it can be accurately determined by removing high-frequency components whether image data is saturated or noisy.

Figure 5:
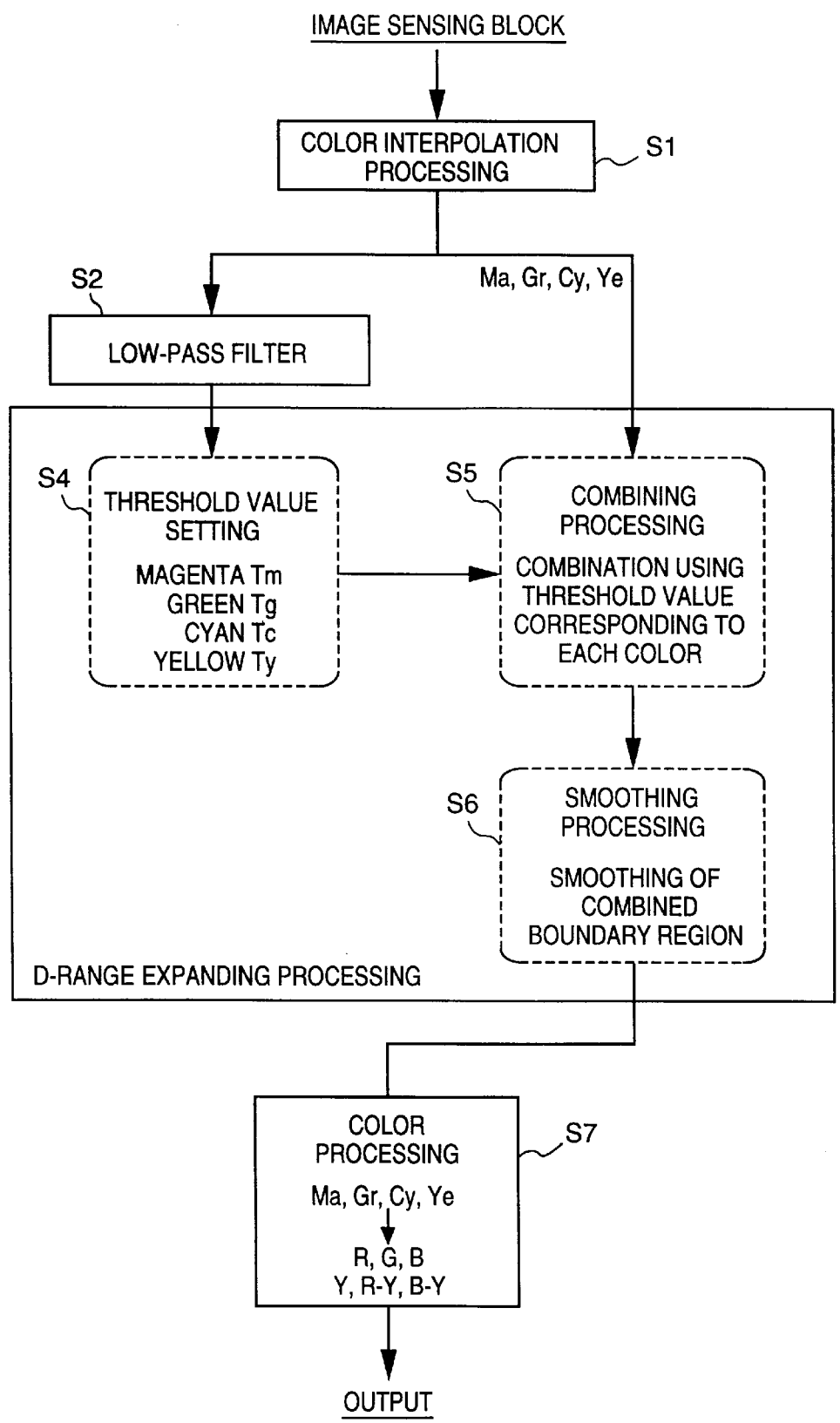
FIG. 5 is a flow chart showing dynamic range expanding processing according to the first embodiment.

FIG. 5 is a flow chart showing the control sequence of the controller 11. In step S1, the interpolation processing circuit 12 is caused to perform interpolation processing of four color image data stored in the memory 7 and return the interpolated image data to the memory 7. In step S2, the controller 11 causes the filter 8 to perform low-pass filter processing of the four color image data (interpolated) stored in the memory 7 and sends the filter-processed image data to the D-range expander 9. Subsequently, the controller 11 causes the D-range expander 9 to perform threshold value setting processing. More specifically, as described above, threshold values (Tm, Tg, Tc, and Ty) used in D-range expanding processing are determined on the basis of the four color image data after low-pass filter processing. The controller 11 stores the determined threshold values, in a predetermined memory (not shown). These threshold values are used to determine a saturated region in D-range expanding processing. The method of determining the threshold values will be described later in detail.

In step S5, the controller 11 selects the path 9b, and causes the processing circuit 9 to perform expanding/combining processing. In D-range expanding processing, the threshold values (Tm, Tg, Tc, and Ty) set for the respective four color image data in units of colors are used to determine a saturated region, and a region determined as a saturated region is replaced with image data of a non-standard image. Non-standard image is an image obtained under improper exposure, while standard image is one obtained under proper exposure. The D-range expanding processing will be described later in detail. The image data with an expanded D-range is returned to the memory 7 by the processing circuit 9.

In step S6, the controller 11 causes the processing circuit 9 to perform smoothing processing. More specifically, the processing circuit 9 performs smoothing processing of the image data with the expanded D-range. The smoothing processing is performed to remove a pseudo contour which may be generated in accordance with D-range expanding processing.

In this manner, the four chrominance signals with the expanded D range are output from the signal processing unit 10 as luminance and color difference signals (step S9).

The operation of the D-range expander 9 according to the first embodiment will be described below in detail.

Figure 6:
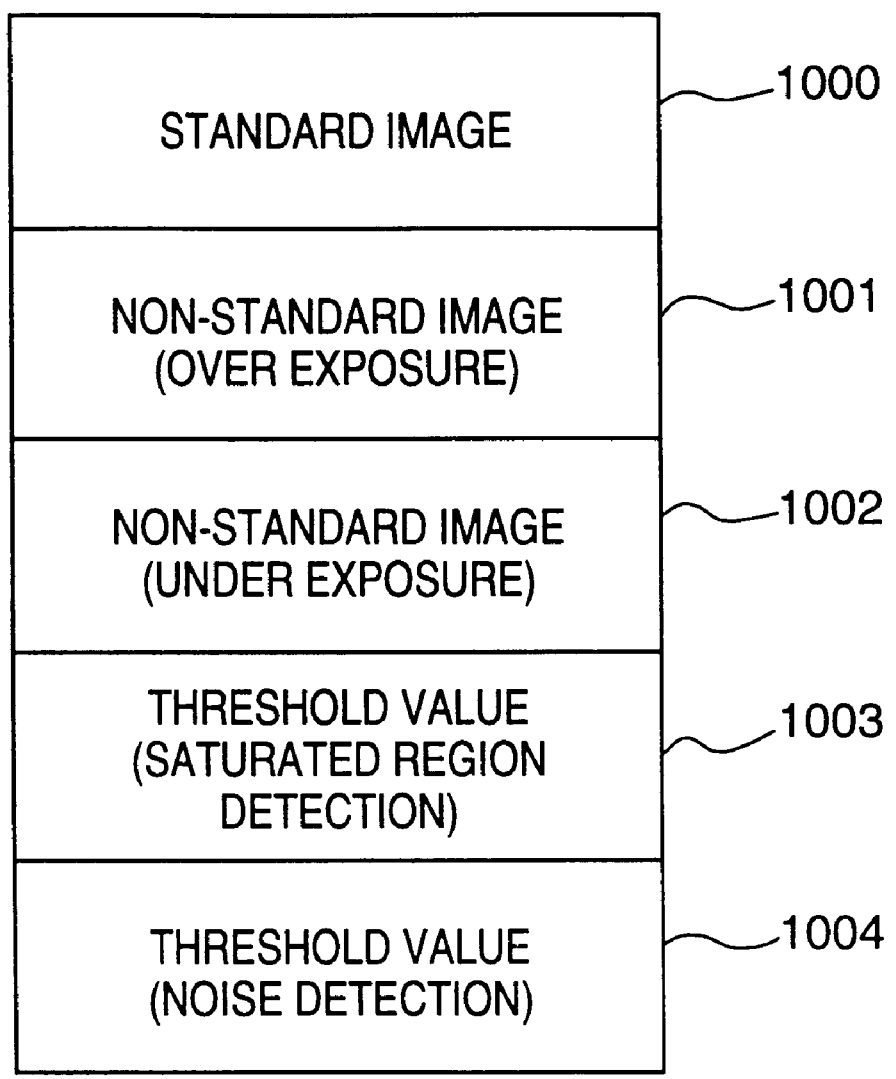
FIG. 6 is a view for explaining a mode of storing a standard image or a non-standard image in the apparatus shown in FIG. 3.

In the expanding processing of the first embodiment, a saturated region present in an image 1000 (FIG. 6) obtained upon sensing an object in a proper exposure (to be referred to as a standard image hereinafter) is replaced with a corresponding region of an image 1002 obtained upon sensing the object in an improper exposure (under exposure) (to be referred to as a non-standard image hereinafter). Six regions shown in FIG. 6 are provided to each of the four colors.

Prior to threshold value setting, the luminance level of the standard image must coincide with that of the non-standard image. As a technique for adjusting the luminance level, a technique proposed by the present applicant in Japanese Patent Application No. 5-271940, 5-271941, 5-271942, 5-271943, 5-272117, or 5-281008 (i.e., a technique described with reference to FIGS. 1A to 1C or 2A to 2C) is used. Therefore, a circuit and program for realizing this technique is implemented in the processing circuit 9.

Figure 7:
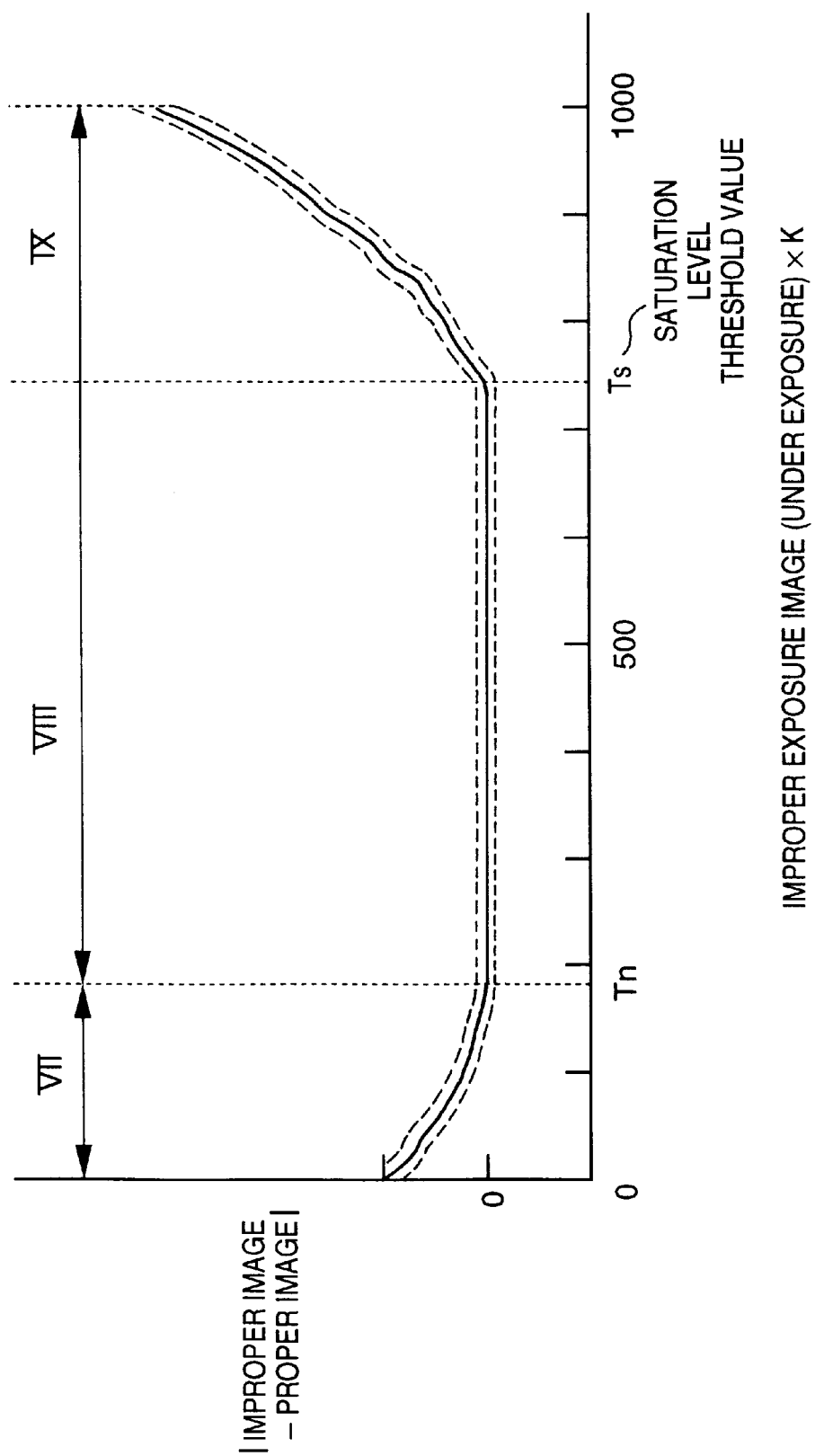
FIG. 7 is a graph for explaining a method of setting a threshold value of the first and second embodiments.

After the luminance level of the standard image 1000 sensed in a proper exposure is adjusted in correspondence with that of the non-standard image 1002 sensed in an improper exposure, the processing circuit 9 performs processing of determining the thresholds values (Tm, Tg, Tc, and Ty) for determining whether a saturated region is present. This threshold value determining processing is performed as follows. As shown in FIG. 7, the pixel value of the image signal of the standard image (or the image signal of the non-standard image) after luminance level adjustment (in FIG. 7, the signal of the non-standard image) is plotted along the abscissa, and the average value of differences between the pixel values of pixels of the standard image 1000 and those of corresponding pixels of a non-standard image 1001, i.e., the average value of |improper image−proper image| is plotted along the ordinate. A value (T in FIG. 7) on the abscissa at a position slightly before the value of |improper image−proper image| increases is set as a threshold value for detecting a saturated region.

The meaning of the technique for determining the threshold value T in FIG. 7 will be described below with reference to FIGS. 8 to 10.

FIG. 8 is a view showing the distribution of pixel values in part of the standard image of an object (image obtained in proper exposure). The characteristic of this standard image roughly lies in that the lower right portion is bright (pixel values are large), and the upper left portion is dark (pixel values are small). FIG. 9 is a view showing the pixel value distribution of a region of the non-standard image obtained upon sensing the object in under exposure, which region corresponds to the region in FIG. 8. The non-standard image shown in FIG. 9 has been processed such that the luminance level coincides with that of the standard image in FIG. 8. More specifically, the pixel value of the non-standard image is multiplied by the luminance level adjustment value K. FIG. 10 is a view showing the absolute values of differences between the pixel values of pixels of the standard image in FIG. 8 and those of corresponding pixels of the non-standard image in FIG. 9, i.e., the values of |improper image×K−proper image|.

Pixels in a region of the standard image of an object, which region is saturated due to the narrow D-range of the image sensing device, have a significant difference in pixel value from those in the corresponding region of the non-standard image obtained upon sensing the region in under exposure. Therefore, the value of |improper image×K−proper image| in such a region is considerably far from zero. Such a region appears as a region IX in FIG. 9 or 10. Pixels in a region of the standard image, which region is neither saturated nor nearly saturated, have no difference from those in the corresponding region of the non-standard image sensed in under exposure. Therefore, the value of |improper image×K−proper image| in such a region is zero or close to zero. Such a region appears as a region VIII in FIG. 9 or 10. In FIG. 9 or 10, a region VII is a dark-noisy region of the non-standard image.

In this manner, when a threshold value Tx for determining a saturated region for one color is determined, threshold values for the remaining colors are also determined accordingly.

<Modification of First Embodiment>

Another technique for setting a threshold value for determining a saturated region will be described with reference to FIG. 11.

Figure 11:
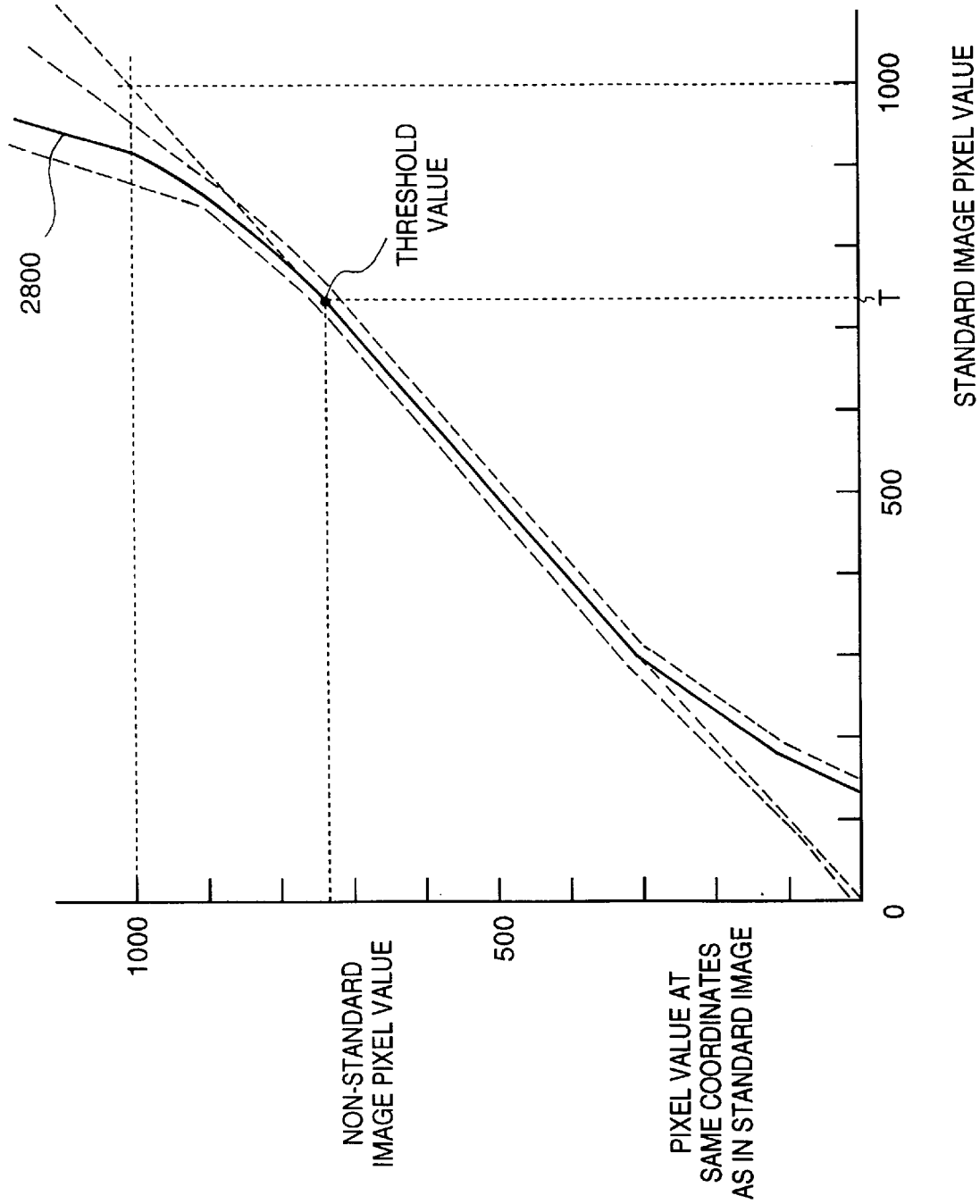
FIG. 11 is a graph for explaining another technique for setting a threshold value.

In this technique, as shown in FIG. 11, pixel values of a standard image are plotted along the X-axis, and pixel values of a non-standard image are plotted along the Y-axis. The pixel value of a pixel of the standard image is plotted along the X-axis, and that of a corresponding pixel of the non-standard image is plotted along the Y-axis. As for a curve 2800 obtained by this plotting, a proper region which is neither saturated nor dark noise has a gradient of about one while a saturated region has a gradient of one or more. Therefore, a threshold value is set at the position represented by T in FIG. 11.

<Replacement of Saturated Pixel Value>

In the above manner, threshold value setting processing is performed by the D-range expander 9, and the threshold values (Tm, Tg, Tc, and Ty) are set (step S4 in FIG. 5). After this setting processing, by using the threshold values (Tm, Tg, Tc, and Ty) for the respective colors, it is determined whether the image signals of the four standard images of Ma, Gr, Ye, and Cy from the interpolation processing circuit 12 have a saturated region. If a saturated region is determined, the pixel value of the region is replaced with the image signal of the non-standard image (non-standard image obtained in an under exposure). This replacement means that the D-range of the image sensing device is expanded by combining the standard image with the non-standard image.

The meaning of smoothing processing in step S6 (FIG. 5) becomes obvious. More specifically, in this embodiment, a threshold value for determining a saturated region is set in units of colors. If one threshold value is set for all colors, the boundary region between the standard image and the non-standard image in the combined image for each color is recognized as a pseudo contour because of the lack of dispersion in units of colors. As in this embodiment, when threshold values dedicated for the respective colors are set, the boundary region between the standard image and the non-standard image changes in units of colors. As a result, dispersion occurs, and dispersion itself means a smoothing effect. Therefore, smoothing processing in step S6 can be omitted.

<Modification of First Embodiment>

In D-range expanding processing of the first embodiment, a saturated region of a standard image sensed in a proper exposure is replaced with the corresponding pixel value of a non-standard image sensed in an under exposure, thereby expanding the D-range. The present invention is not limited to this and can also be applied to a case wherein a noise image region of a standard image is replaced with corresponding image data of a non-standard image sensed in an improper exposure (over exposure) to expand the D-range. In this case, a graph as shown in FIG. 7 is prepared, and a value immediately before the value of |standard image−non-standard image×K| decreases from a non-zero value to reach zero is set as a threshold value.

In addition, the following modification can also be proposed. In the first embodiment, a saturated region is replaced with a non-standard image obtained in an under exposure, or a noise region is replaced with a non-standard image obtained in an over exposure. In other words, two images (a standard image and a non-standard image obtained in an under exposure, or a standard image and a non-standard image obtained in an over exposure) are combined with each other, thereby expanding the D-range of the image sensing device. The present invention is not limited to this and can also be applied to a case wherein three images, i.e., a standard image, a non-standard image (under exposure), and another non-standard image (over exposure) are combined to expand the D-range. That is, two or more images can be used for combination.

According to the image processing method and apparatus of the first embodiment, threshold values are calculated in correspondence with the color filters of the image sensing device, and threshold values corresponding to chrominance signals output from the image sensing device and color-separated are used to determine regions. With this operation, erroneous determination in noisy or saturated region determination, which is caused by the difference in color spectral sensitivity, can be prevented. Since a threshold values is set in units of colors, a pseudo contour in a division boundary region, which is generated in use of a specific threshold value, can be minimized. As a result, an image without saturated or noisy region and with an expanded D-range can be combined.

<Second Embodiment>

In the first embodiment, to detect a saturated region, a plurality of threshold values corresponding to the respective colors are used. This technique poses the following problem of hue offset. Generally, when image signals of the respective colors are to be obtained by using different color filters of an imaging sensing device, chrominance signals constituting a pixel receive different exposure amounts. As a result, when region determination is performed using different threshold values, the hue changes. For example, when color filters shown in FIG. 4 are used, image sensing devices having a sensitivity for Ye in the four colors are saturated at a relatively low illuminance as compared to the remaining colors, so the threshold value for Ye tends to become smaller than those of the remaining colors, though this depends on color temperature. For this reason, in image combining, an image signal from a standard image is used as a combined image of Ma, Gr, Cy which are not saturated while an image signal from a non-standard image is used as a combined image of saturated Ye. As a result, the hue offsets.

In the second embodiment to be described below, the minimum value of the four threshold values corresponding to the respective colors is used as a threshold value to prevent the above-described hue offset. More specifically, in the above example, the threshold value for Ye is used for all the remaining colors.

Since the processing technique of a D-range expander 9 is different from that in the first embodiment, the arrangement of the second embodiment is the same as that of the first embodiment (arrangement in FIG. 3). Therefore, the arrangement of the image sensing apparatus of the second embodiment will be described with reference to FIG. 3, and the control sequence of a controller 11 will be described with reference to FIG. 12.

Figure 12:
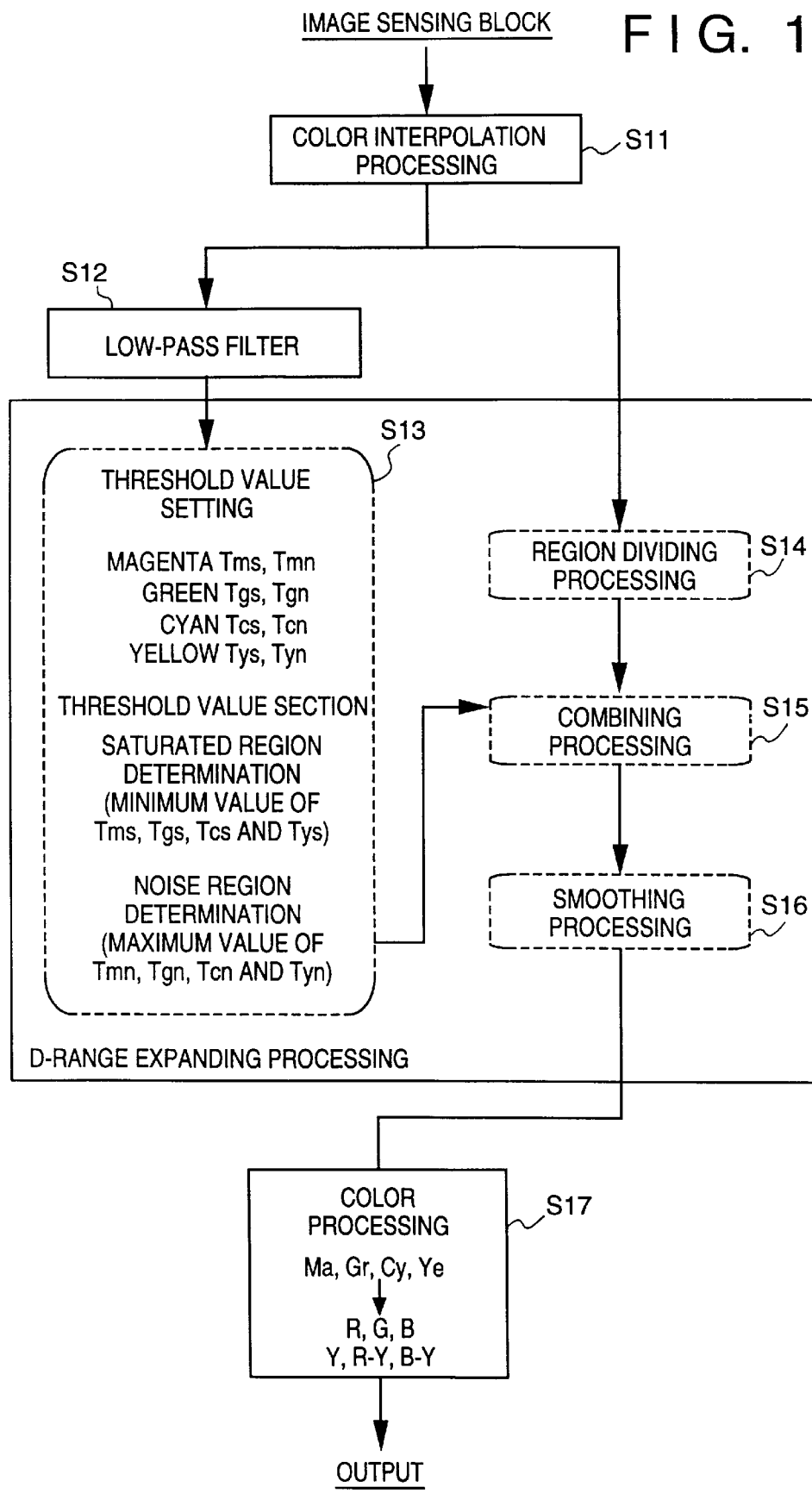
FIG. 12 is a view for explaining a technique for expanding the dynamic range according to the second embodiment.

Steps S11 and S12 in FIG. 12 are the same as steps S1 and S2 of the first embodiment, and a detailed description thereof will be omitted.

In step S13 of the second embodiment, threshold value setting processing and threshold value selecting processing are performed, and it is determined whether the image signal is saturated, proper, or noisy. More specifically, threshold values Tms (for determining saturation) and Tmn (for determining a noise region) for magenta, threshold values Tgs (for determining saturation) and Tgn (for determining a noise region) for green, threshold values Tcs (for determining saturation) and Tcn (for determining a noise region) for cyan, and threshold values Tys (for determining saturation) and Tyn (for determining a noise region) for yellow are set first. The threshold value setting technique is the same as that of the first embodiment (technique in FIG. 7 or 11). Subsequently, the following calculation is performed to obtain a threshold value Ts for determining a saturated region:

$$Ts=\mathrm{Min}(Tms, Tgs, Tcs, Tys)$$

In addition, the following calculation is performed to obtain a threshold value Tn for determining a noise region:

$$Tn=\mathrm{Max}(Tmn, Tgn, Tcn, Tyn)$$

The reason why the maximum value of Tmn, Tgn, Tcn, and Tyn is used as the threshold value Tn for determining a noise region is as follows. An image sensing device having a large noise (i.e., a low sensitivity) generates a dark-noisy region even at a high illuminance. Therefore, selecting the maximum value of the threshold values for the respective colors assures to discriminate dark-noisy regions for all the colors. Further, the two selected threshold values Ts and Tn are used for image data of four color standard images, thereby determining saturated regions, dark noise regions, and proper regions. In step S14, the standard image is divided in accordance with determination.

In step S15, a region determined as a saturated region is replaced with the image signal of a non-standard image obtained in an under exposure, and a region determined as a dark-noisy region is replaced with the image signal of a non-standard image obtained in an over exposure.

In step S16, smoothing processing of the combined image is performed to eliminate the pseudo contour. In the first embodiment, the smoothing processing is optional. In the second embodiment, the smoothing processing is important because the frequency of pseudo contour generation is increased by using the same threshold value.

<Modification of Second Embodiment>

In D-range expanding processing of the second embodiment, a saturated region of a standard image sensed in a proper exposure is replaced with the corresponding region of a non-standard image sensed in an improper exposure (under exposure), and a noise region of the standard image is replaced with the corresponding region of the non-standard image sensed in an improper exposure (over exposure). The present invention is not limited to this and can also be modified such that only replacement of the saturated region of the standard image with the corresponding region of the non-standard image sensed in an under exposure, or only replacement of the noise region of the standard image with the corresponding region of the non-standard image sensed in an over exposure is performed. In this case, two images, i.e., the standard image and the non-standard image (under or over exposure) suffices.

As described above, according to the image processing method and apparatus of the second embodiment, of a plurality of image data obtained upon sensing an identical scene in different exposure amounts, a noise region of the standard image sensed in a proper exposure is replaced with the corresponding region of the non-standard image sensed in an over exposure, and a saturated region of the standard image sensed in a proper exposure is replaced with the corresponding region of the non-standard image sensed in an under exposure, thereby combining an image with an expanded D-range.

In the method of determining a dark noise or saturated region, threshold values are calculated in correspondence with the color filters of the image sensing device. When a saturated region is to be determined, the minimum value of the plurality of threshold values is used, and when a dark noise region is to be determined, the maximum value of the plurality of threshold values is used. In use of the plurality of threshold values, the hue change caused when the chrominance signals constituting one pixel are generated from image signals obtained in different exposure amounts can be prevented. As a result, an image without any dark noise or saturated region and with an expanded D-range can be obtained.

As many apparently widely different embodiments of the present invention can be made without departing from the spirit and scope thereof, it is to be understood that the invention is not limited to the specific embodiments thereof except as defined in the appended claims.

What is claimed is:

1. An image processing method of forming an image based on color signals output from an image sensing device, comprising:
    the image picking-up step of picking up, in advance by said image sensing device, a first plurality of color signals in a standard exposure and a second plurality of color signals in a non-standard exposure;
    the threshold value setting step of setting a different threshold value for each color; and
    the combining step of generating a combined color signal by replacing, for each color, a part of a color signal out of the first plurality of color signals obtained in the standard exposure with a corresponding part of a corresponding color signal of the second plurality of color signals, a replacement of a color signal part being made on the basis of the threshold value set for the color.

2. The method according to claim 1, wherein the combining step further comprises the steps of:
    determining whether or not a part of a color signal of the first plurality of color signals is saturated using a threshold value for the color signal set in the threshold value setting step; and
    replacing the part of the color signal which is determined as saturated with the corresponding part of the corresponding color signal of the second plurality of color signals.

3. The method according to claim 2, wherein an exposure amount of the non-standard exposure is smaller than an exposure amount of the standard exposure.

4. The method according to claim 1, wherein the combining step further comprises the steps of:
    determining whether or not a part of a color signal of the first plurality of color signals which have been picked up in the standard exposure exhibits a dark noise with respect to a threshold value for the color signal set in the threshold value setting step; and
    replacing the part of the color signal which is determined as of low-sensitivity with the corresponding part of the corresponding color signal of the second plurality of color signals.

5. The method according to claim 4, wherein an exposure amount of the non-standard exposure is larger than an exposure amount of the standard exposure.

6. The method according to claim 1, wherein the threshold value setting step includes the step of determining a threshold value corresponding to each color on the basis of the first and second plurality of color signals.

7. The method according to claim 1, wherein the threshold value setting step includes the step of calculating the threshold value corresponding to each color by using an average value of a difference between the first and second plurality of color signals.

8. The method according to claim 1, wherein the threshold value setting step includes the step of determining the threshold value corresponding to each color depending on whether a degree of change in the color signal out of the second plurality of color signals with respect to the color signal out of the first plurality of color signals obtained in the picking-up step is large.

9. An image processing method of forming an image based on color signals output from an image sensing device, comprising:
    the image picking-up step of picking up, in advance by said image sensing device, a first plurality of color signals in a standard exposure and a second plurality of color signals in a non-standard exposure;
    the threshold value setting step of setting a threshold value for each color on the basis of the first plurality of color signals obtained in the standard exposure and the second plurality of color signals obtained in the non-standard exposure, in the image picking-up step; and
    the combining step of generating a combined color signal by replacing, for each color, a part of a color signal out of the first plurality of color signals obtained in the standard exposure with the corresponding part of a corresponding color signal of the second plurality of color signals, a replacement of a color signal part being made on the basis of a lowest threshold value out of threshold values for the color set in the threshold value setting step.

10. The method according to claim 9, wherein the combining step further comprises the steps of:
    determining whether or not a part of a color signal of the first plurality of color signals is saturated using a threshold value for the color signal set in the threshold value setting step; and
    replacing the part of the color signal which is determined as saturated with the corresponding part of the corresponding color signal of the second plurality of color signals.

11. The method according to claim 10, further comprising the step of performing smoothing processing of the replaced image.

12. The method according to claim 9, wherein the threshold value setting step includes the step of calculating a threshold value corresponding to each color by using an average value of a difference between the first and second plurality of color signals.

13. The method according to claim 9, wherein the threshold value setting step includes the step of determining a threshold value corresponding to each color depending on whether a degree of change in the color signal out of the second plurality of color signals with respect to the color signal out of the first plurality of color signals is large.

14. The method according to claim 9, wherein an exposure amount of the non-standard exposure is smaller than an exposure amount of the standard exposure.

15. An image processing method of forming an image based on color signals output from an image sensing device, comprising:
    the image picking-up step of picking up, in advance by said image sensing device, a first plurality of color signals in a standard exposure and a second plurality of color signals in a non-standard exposure;
    the threshold value setting step of setting a threshold value for each color on the basis of the first plurality of color signals obtained in the standard exposure and the second plurality of color signals obtained in the non-standard exposure, in the image picking-up step; and the combining step of generating a combined color signal by replacing, for each color, a part of a color signal out of the first plurality of color signals obtained in the standard exposure with a corresponding part of a corresponding color signal of the second plurality of color signals, a replacement of a color signal part being made on the basis of a highest threshold value out of threshold values for the color set in the threshold value setting step.

16. The method according to claim 15, wherein the combining step further comprises the steps of:

determining whether or not a part of a color signal of the first plurality of color signals exhibits a dark noise with respect to a threshold value for the color signal set in the threshold value setting step; and replacing the part of the color signal which is determined as of low-sensitivity with the corresponding part of the corresponding color signal of the second plurality of color signals.

17. The method according to claim 10, further comprising the step of performing smoothing processing of the replaced image.

18. The method according to claim 15, wherein the threshold value setting step includes the step of calculating a threshold value corresponding to each color by using an average value of a difference between the first and second plurality of color signals.

19. The method according to claim 15, wherein the threshold value setting step includes the step of determining a threshold value corresponding to each color depending on whether a degree of change in the color signal out of the second plurality of color signals with respect to the color signal out of the first plurality of color signals is large.

20. The method according to claim 15, wherein an exposure amount of the non-standard exposure is larger than an exposure amount of the standard exposure.

21. An image processing apparatus which forms an image based on color signals output from an image sensing device, comprising:

image picking-up means for picking up, in advance by said image sensing device, a first plurality of color signals in a standard exposure and a second plurality of color signals in a non-standard exposure;

threshold value setting means for setting a threshold value for each color signal; and combining means for generating a combined color signal by replacing, for each color, with a corresponding part of a corresponding color signal of the second plurality of color signals, a replacement of a color signal part being made on the basis of the threshold value set for the color.

22. An image processing apparatus for forming an image based on color signals output from an image sensing device, comprising:

image picking-up means for picking up, in advance by said image sensing device, a first plurality of color signals in a first exposure and a second plurality of color signals in a second exposure, an amount of the second exposure being larger than an amount of the first exposure;

threshold value setting means for setting a threshold value for each color on the basis of the first plurality of color signals obtained in the first exposure and the second plurality of color signals obtained in the second exposure, by the image picking-up means; and combining means for generating a combined color signal by replacing, for each color, a part of a color signal out of the first plurality of color signals obtained in the first exposure with a corresponding part of a corresponding color signal of the second plurality of color signals, a replacement of a color signal part being made on the basis of a lowest threshold value out of threshold values for the color set by the threshold value setting means.

23. An image processing apparatus for forming an image based on color signals output from an image sensing device, comprising:

image picking-up means for picking up, in advance by said image sensing device, a first plurality of color signals in a first exposure and a second plurality of color signals in a second exposure, an amount of the second exposure being larger than an amount of the first exposure;

threshold value setting means for setting a threshold value predetermined color filter of said image sensing device for each color on the basis of the first plurality of color signals obtained in the first exposure and the second plurality of color signals obtained in the second exposure, by the image picking-up means; and combining means for generating a combined color signal by replacing, for each color, a part of a color signal out of the first plurality of color signals obtained in the first exposure with a corresponding part of a corresponding color signal of the second plurality of color signals, a replacement of a color signal part being made on the basis of a highest threshold value out of threshold values for the color set by the threshold value setting means.

24. An image processing method of forming an image based on color signals output from an image sensing device, comprising:

an image picking-up step of picking up, in advance by said image sensing device, a plurality of color signals in respective exposures, the respective exposures being different from each other;

a threshold value setting step of setting a threshold value for each color on the basis of a predetermined kind of color signal from among the plurality of color signals obtained in the image picking-up step; and the combining step of generating a combined color signal by selecting, for each color, a color signal from among the plurality of color signals obtained in the image picking-up step, the color signal being selected using the one of the threshold values set in the threshold value setting step which corresponds to the selected color signal.

25. The method according to claim 24, wherein the threshold value is a value that does not saturate all color signals obtained in at least two different exposures from among the respective exposures.

26. The method according to claim 24, wherein the threshold value is a value that does not generate a noise in all color signals obtained in at least two different exposures from among the respective exposures.

27. The method according to claim 24, wherein the predetermined kind of color signal used in the threshold value setting step is yellow.

28. An image processing apparatus for forming an image based on color signals output from an image sensing device, comprising:

image picking-up means for picking up, in advance by said image sensing device, a plurality of color signals in respective exposures, the respective exposures being different from each other;

threshold value setting means for setting a threshold value for each color on the basis of a predetermined kind of color signal from among the plurality of color signals obtained by the image picking-up means; and combining means for generating a combined color signal by selecting, for each color, a color signal from among the plurality of color signals obtained by the image picking-up means, the color signal being selected using the one of the threshold values set in the threshold value setting means which corresponds to the selected color signal.

29. The apparatus according to claim 28, wherein the threshold value is a value that does not saturate all color signals obtained in at least two different exposures from among the respective exposures.

30. The apparatus according to claim 28, wherein the threshold value is a value that does not generate a noise in all color signals obtained in at least two different exposures from among the respective exposures.

31. The apparatus according to claim 28, wherein the predetermined kind of color signal used by the threshold value setting means is yellow.

* * * * *

UNITED STATES PATENT AND TRADEMARK OFFICE
CERTIFICATE OF CORRECTION

PATENT NO.    : 6,040,858
DATED         : March 21, 2000
INVENTOR(S)   : Eiichiro Ikeda Page 1 of 1

It is certified that error appears in the above-identified patent and that said Letters Patent is hereby corrected as shown below:

Title page,
Please add under Item [73]:
-- [*] Notice: This patent issued on a continued prosecution application filed under 37 CFR1.53(d), and is subject to the twenty year patent term provision of 35 U.S.C. 154 (a) (2) --

Column 2,
Line 27, "Iv" should read -- IV --

Column 3,
Line 64, "still, another" should read -- still another --

Column 4,
Line 31, "saturated-region;" should read -- saturated region; --

Column 6,
Line 55, "D range" should read -- D-range --

Column 13,
Line 23, "claim 10" should read -- claim 16 --

Signed and Sealed this

Nineteenth Day of August, 2003

JAMES E. ROGAN
*Director of the United States Patent and Trademark Office*